United States Patent
vom Stein

(10) Patent No.: US 7,204,218 B2
(45) Date of Patent: Apr. 17, 2007

(54) SEALING ARRANGEMENT AND CYLINDER HEAD COVER WITH SUCH SEALING ARRANGEMENT

(75) Inventor: Hans-Joachim vom Stein, Odenthal (DE)

(73) Assignee: AB SKF, Gothenburg (SE)

(*) Notice: Subject to any disclaimer, the term of this patent is extended or adjusted under 35 U.S.C. 154(b) by 70 days.

(21) Appl. No.: 11/068,934

(22) Filed: Mar. 2, 2005

(65) Prior Publication Data
US 2005/0199203 A1 Sep. 15, 2005

(30) Foreign Application Priority Data
Mar. 2, 2004 (DE) ............... 10 2004 010 609

(51) Int. Cl.
*F01M 9/10* (2006.01)
(52) U.S. Cl. ............... 123/90.38; 123/90.37; 123/195 C; 29/888.01
(58) Field of Classification Search ......... 123/90.34, 123/90.37, 90.33, 195 C; 29/888.01
See application file for complete search history.

(56) References Cited

U.S. PATENT DOCUMENTS

| 3,519,279 | A | | 7/1970 | Wagner |
| 5,085,905 | A | * | 2/1992 | Beck ............... 428/35.9 |
| 5,201,625 | A | | 4/1993 | Takenouchi et al. |
| 5,255,647 | A | | 10/1993 | Kiczek |
| 5,957,100 | A | | 9/1999 | Frohwerk et al. |
| 2002/0170775 | A1 | | 11/2002 | Stein et al. |
| 2005/0193971 | A1 | | 9/2005 | Stein |

FOREIGN PATENT DOCUMENTS

| DE | 197 38 276 C1 | 10/1998 |
| DE | 101 19 892 C2 | 11/2002 |
| DE | 101 19 892 C2 | 4/2003 |
| DE | 10 2004 010 586 A1 | 9/2005 |
| GB | 2 328 978 A | 3/1999 |

* cited by examiner

Primary Examiner—Thomas Denion
Assistant Examiner—Zelalem Eshete
(74) Attorney, Agent, or Firm—Buchanan Ingersoll & Rooney PC

(57) ABSTRACT

The invention relates to a sealing arrangement with at least one hole through which the sealing arrangement is adapted to be attached to the contact surface of a device which is to be sealed. One area of the sealing arrangement around the hole containing a stiffening element which extends in the manner of a perforated disk at least in this area, which has an inside area which is formed continuing axially in the direction to the contact surface, and contains an elastomer element which is joined to the inside area of the stiffening element, locking it in the radial direction. The elastomer element has a bulge to the inside.

18 Claims, 3 Drawing Sheets

SEALING ARRANGEMENT AND CYLINDER HEAD COVER WITH SUCH SEALING ARRANGEMENT

This application is based on and claims priority under 35 U.S.C. § 119 with respect to German Application No. 10 2004 010 609.6 filed on Mar. 2, 2004, the entire content of which is incorporated herein by reference.

FIELD OF THE INVENTION

The invention generally relates to a sealing arrangement. More particularly, the invention pertains to a sealing arrangement with at least one hole through which the sealing arrangement can be attached to the contact surface of a device which is to be sealed, and a cylinder head cover with such sealing arrangement.

BACKGROUND DISCUSSION

DE 101 19 892 C2 discloses one example of a cylinder head cover of an internal combustion engine. The disclosed cylinder head cover comprises a carrier element which is intended for mounting on the internal combustion engine, a cover, and an elastomer part which forms a sealing lip and which connects the carrier element and the cover.

SUMMARY

A cylinder head cover of an internal combustion engine comprises an elastomer part in which is embedded a stiffening element, with the cylinder head cover being provided with at least one hole to attach the cylinder head cover to a contact surface of an internal combustion engine. The stiffening element is formed as a perforated disk extending around the hole. The stiffening element comprises an inside area formed continuing axially in a direction toward the contact surface, with a portion of the elastomer part adjoining the inside area of the stiffening element to lock the stiffening element in the radial direction. The elastomer part also possesses a bulge to the inside.

A sealing arrangement comprises at least one hole through which the sealing arrangement is adapted to be attached to a contact surface of a device which is to be sealed. One area of the sealing arrangement around the hole contains a stiffening element which extends as a perforated disk at least in the one area, and which has an inside area formed continuing axially in a direction toward the contact surface. The sealing arrangement contains an elastomer element which adjoins the inside area of the stiffening element to lock the stiffening element in the radial direction, with the elastomer element possessing a bulge to the inside.

BRIEF DESCRIPTION OF THE DRAWING FIGURES

The foregoing and additional features and characteristics of disclosed embodiments of the invention will become more clear from the following detailed description considered with reference to the accompanying drawing figures in which like elements are designated by like reference numerals.

DETAILED DESCRIPTION

Figure 1:
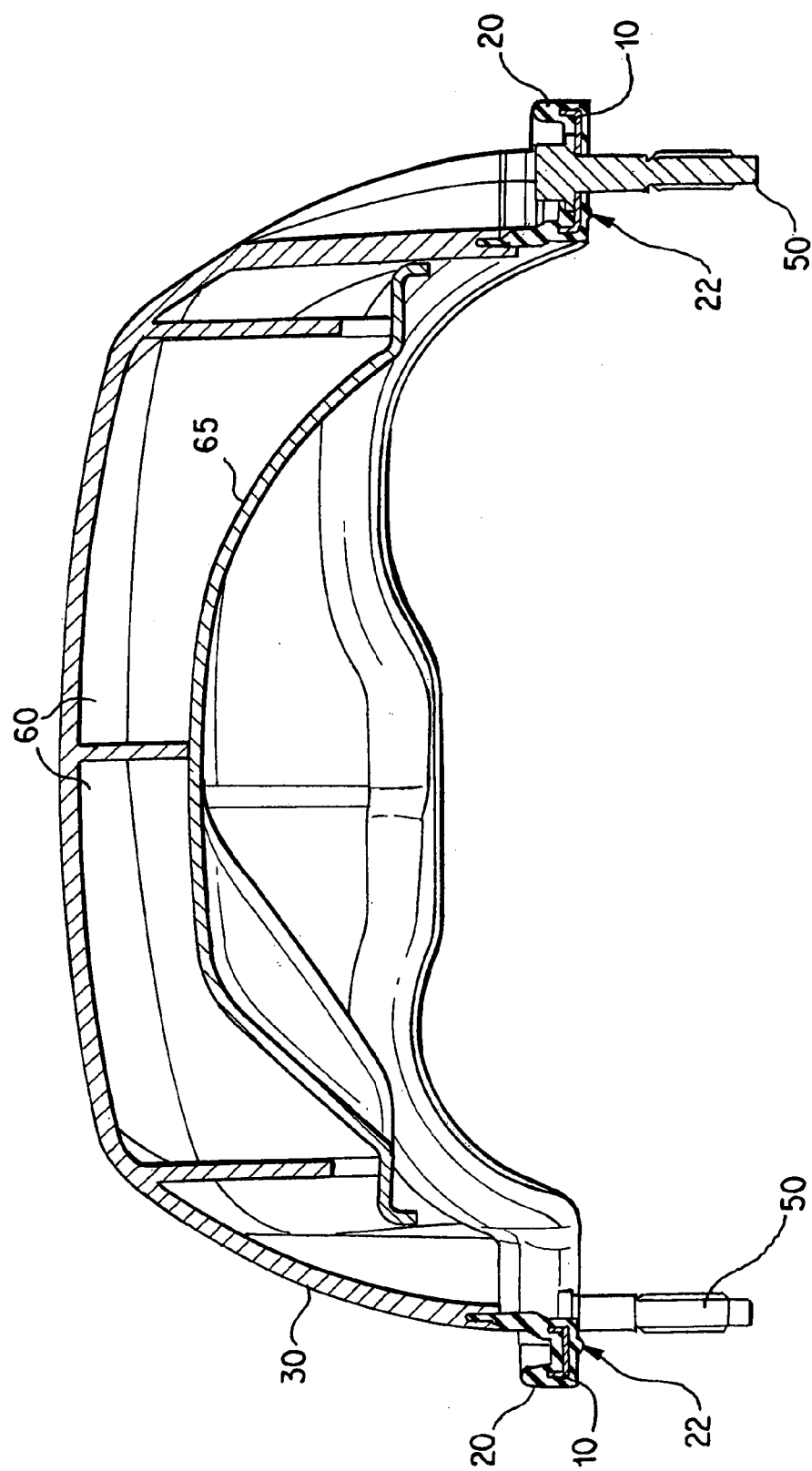
FIG. 1 is a cross-sectional view of a cylinder head cover with screws.

FIG. 1 shows in cross-section one embodiment of the cylinder head cover. The cylinder head cover comprises an elastomer part 20 which extends or runs peripherally like a frame, with a sealing lip 22, for tightly adjoining the contact surface of an internal combustion engine. A stiffening element is located or embedded within the elastomer part 20. The stiffening element 10 likewise runs peripherally like a frame. The stiffening element possesses a generally U-shaped cross-section or profile and may be composed of several sheet metal stampings.

During manufacture, the stiffening element 10 may be coated with an adhesive and the elastomer part 20 then molded onto the stiffening element 10 by an injection molding process. The elastomer part 20 comprises rubber or silicone. Furthermore the elastomer part 20 and the stiffening part 10 are provided with openings or holes through which the cylinder head cover can be attached to the contact surface via fasteners, for example the screws 50 shown in FIG. 1.

The cylinder head cover also comprises a cover-like part 30 which may be made of plastic. The cover-like part 30 adjoins the elastomer part 20. The elastomer part 20 is connected to the cover-like part 30 by virtue of the elastomer part 20 being molded into a U-shaped groove of the cover-like part 30. Also as shown in FIG. 1, the upper area of the cylinder head cover is provided with function spaces 60 for oil separation which are bordered to the bottom by a bottom element 65 of the cylinder head cover.

Figure 2:
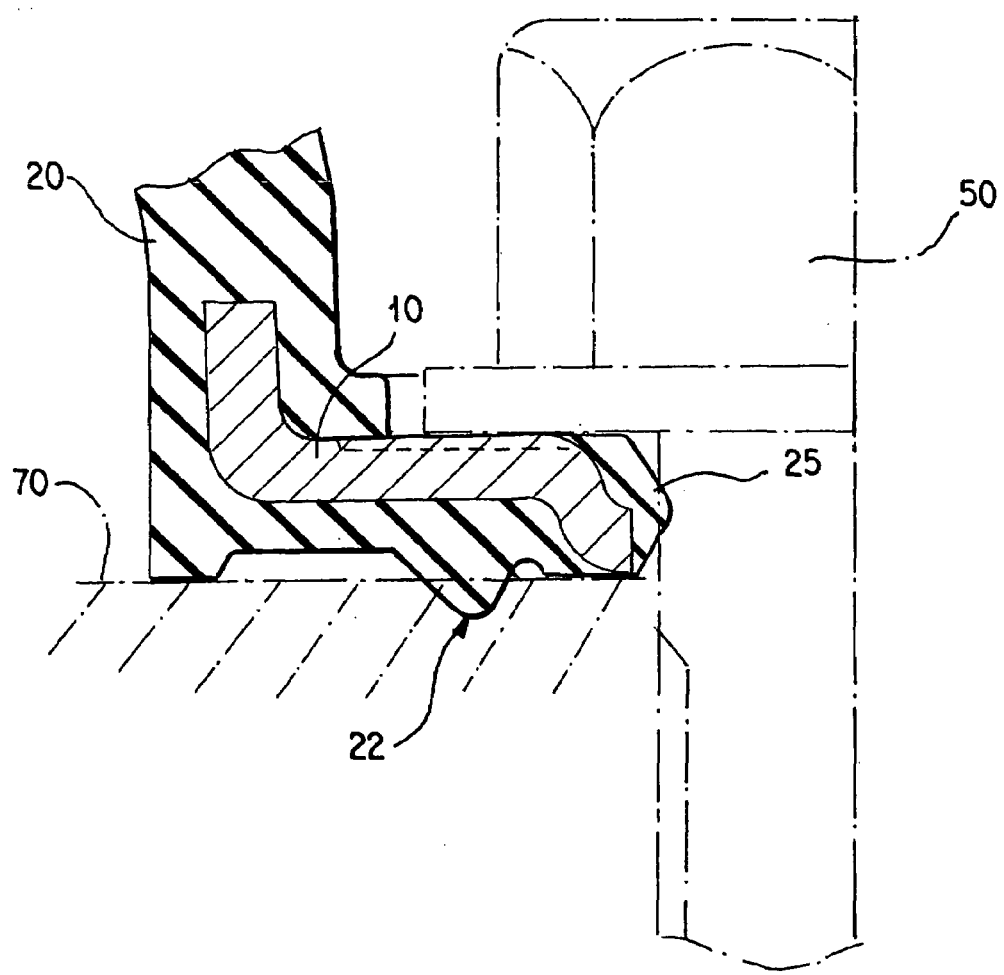
FIG. 2 is an enlarged cross-sectional view of a portion of the cylinder head cover shown in FIG. 1 in the area of one of the screws.

FIG. 2 shows on an enlarged scale a portion of the cylinder head cover in the area of the right screw 50. FIG. 2 shows the elastomer part 20 and an elastomer element 25 in the state in which the screw 50 which is shown with the broken line has not been inserted into the hole and the elastomer part 20 is not attached to the contact surface 70 of the internal combustion engine, which surface is likewise shown by the broken line, to form a seal. The stiffening element 10 extends at least in one area around the hole for the screw 50 in the manner of a perforated disk, the inside area of the perforated disk-like area being formed to continue axially in the direction to the contact surface 70. The indicated inside area adjoins the elastomer element 25 which continues the inside area in the radial direction and which has a peripherally extending bulge directed inwardly to the inside as shown in FIG. 2. When the screw 50 is inserted into the hole, the bulge is deformed such that the screw 50 is captively held in the hole by friction. The screw 50 is free of a thread along a portion of its length (e.g., 3 mm) in which the bulge properly fits or engages.

Figure 3:
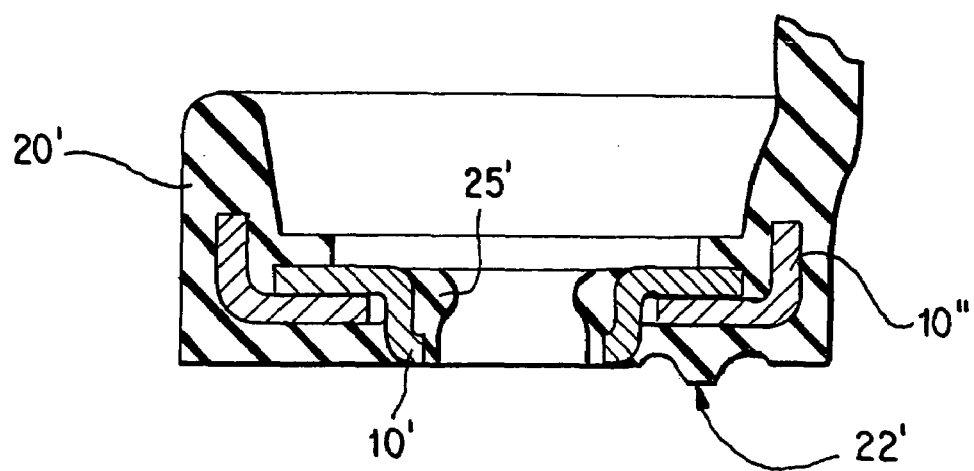
FIG. 3 is an enlarged cross-sectional view of a portion of the cylinder head cover according to another embodiment.

FIG. 3 shows another embodiment of the invention in which, instead of the above described stiffening element 10 which is made in one piece in the area of the hole, the stiffening element is formed from two separate partial stiffening elements 10', 10". The other features described above in connection with FIGS. 1 and 2 apply here, with the features in FIG. 3 being designated by the same reference numerals as the corresponding features in FIGS. 1 and 2, except for the addition of a prime mark (').

With respect to the connection of the two partial stiffening elements 10', 10" over their opposing surfaces, reference is made to the description in the patent application filed on the same date as this application, naming the same inventor as the inventor named in this application, and entitled "Sealing Arrangement and Process for Producing Such Sealing Arrangement" Ser. No. 11/068,885, with the description in such application being incorporated herein by reference.

The disclosed embodiment of the sealing arrangement and cylinder head cover allows for the sealing arrangement to be captively carried along with the sealing arrangement in preparation for installation. Because the elastomer element has a bulge, fasteners (e.g., a screw) can be captively inserted in the hole and held in place. When placed on the device which is to be sealed, for a sealing arrangement which is equipped with a screw, the screw is pressed back to a residual amount, the tip of the screw at the same time being located in the corresponding threaded hole of the device. Then the pretensioning force of the screw as it is being screwed down is transferred especially advantageously to the contact surface via the part of the perforated disk-like stiffening element which continues in the direction of the contact surface, so that the elastomer element remains substantially undamaged.

The principles and preferred embodiments have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A cylinder head cover of an internal combustion engine comprising:
   a cover part; and
   an elastomer part in which is embedded a stiffening element, wherein
   the elastomer part extends peripherally around the cover part and is connected to the cover part,
   the elastomer part and the stiffening element are each provided with at least one hole to attach the cylinder head cover to a contact surface of an internal combustion engine,
   around the at least one hole the elastomer part and the stiffening element each forming an annular perforated disk region,
   the region of the stiffening element comprising an inside area formed continuing axially in a direction toward a surface of the elastomer part which is adapted to engage the contact surface,
   a portion of the region of the elastomer part adjoining the inside area of the stiffening element to enclose the region of the stiffening element in a radial direction, and
   the region of the elastomer part possessing a bulge to the inside.

2. The cylinder head cover according to claim 1, wherein the bulge possesses a diameter such that a fastener inserted into the at least one hole is securely held against movement by friction relative the bulge.

3. The cylinder head cover according to claim 2, wherein the fastener comprises a screw which is devoid of a thread over a portion of the screw in which the bulge contacts the screw.

4. The cylinder head cover according to claim 1, wherein part of an outside area of the stiffening element is locked axially in a direction away from the contact surface.

5. The cylinder head cover according to claim 1, wherein the elastomer part also comprises a sealing lip.

6. The cylinder head cover according to claim 1, wherein the stiffening element is a sheet metal part.

7. The cylinder head cover according to claim 1, wherein the stiffening element is provided with an adhesive and the elastomer part is injection molded to the stiffening element.

8. The cylinder head cover according to claim 1, wherein the bulge extends peripherally in a radial plane.

9. A sealing arrangement comprising:
   an elastomer element in which is embedded a stiffening element,
   at least one hole extending through the elastomer element and the stiffening element by which the sealing arrangement is adapted to be attached to a contact surface of a device which is to be sealed,
   around the hole the elastomer element and the stiffening element each forming an annular perforated disk region,
   an inside area of the region of the stiffening element adjacent the at least one hole continuing axially in a direction toward a surface of the sealing arrangement which is adapted to engage the contact surface,
   the region of the elastomer element adjoining the inside area of the region of the stiffening element to enclose the stiffening element in the radial direction, and
   the region of the elastomer element possessing a bulge to the inside.

10. The sealing arrangement according to claim 9, wherein the bulge possesses a diameter such that a fastener inserted into the hole is securely held by friction against the bulge.

11. The sealing arrangement according to claim 10, wherein the fastener comprises a screw which is free of a thread in an area in which the bulge contacts.

12. The sealing arrangement according to claim 9, wherein part of an outside area of the stiffening element is formed axially in a direction away from the contact surface.

13. The sealing arrangement according to claim 9, wherein the elastomer element comprises a portion of an elastomer part, the elastomer part being provided at least on one surface of the stiffening element which extends essentially radially and faces the contact surface.

14. The sealing arrangement according to claim 13, wherein the elastomer part also forms a sealing lip.

15. The sealing arrangement according to claim 9, wherein the stiffening element is a sheet metal part.

16. The sealing arrangement according to claim 9, wherein the stiffening element is provided with an adhesive and the elastomer element is injection molded to the stiffening element.

17. The sealing arrangement according to claim 9, wherein the bulge extends peripherally in a radial plane.

18. The sealing arrangement according to claim 9, wherein the elastomer element also forms a sealing lip.

* * * * *